United States Patent
Ruppel et al.

(10) Patent No.: US 10,119,283 B2
(45) Date of Patent: Nov. 6, 2018

(54) CONCRETE DISTRIBUTOR MAST

(71) Applicant: Putzmeister Engineering GmbH, Aichtal (DE)

(72) Inventors: Jochen Ruppel, Bad Soden-Salmuenster Kerbersdorf (DE); Peter Hasel, Fildserstadt (DE); Martin Gusenbauer, Metzingen (DE); Martin Rivinius, Neubulach (DE); Karl Westermann, Walddorfhaeslach (DE); Roman Riebenstahl, Gelnhausen (DE)

(73) Assignee: Putzmeister Engineering GmbH, Aichtal (DE)

( * ) Notice: Subject to any disclaimer, the term of this patent is extended or adjusted under 35 U.S.C. 154(b) by 0 days.

(21) Appl. No.: 14/422,274

(22) PCT Filed: Jul. 11, 2013

(86) PCT No.: PCT/EP2013/064639
§ 371 (c)(1),
(2) Date: Feb. 18, 2015

(87) PCT Pub. No.: WO2014/032840
PCT Pub. Date: Mar. 6, 2014

(65) Prior Publication Data
US 2015/0204089 A1    Jul. 23, 2015

(30) Foreign Application Priority Data

Aug. 31, 2012 (DE) .......................... 10 2012 215 469

(51) Int. Cl.
*F16C 11/04* (2006.01)
*E04G 21/04* (2006.01)

(52) U.S. Cl.
CPC ......... *E04G 21/0445* (2013.01); *E04G 21/04* (2013.01); *E04G 21/0436* (2013.01);
(Continued)

(58) Field of Classification Search
CPC ... F16C 11/045; E04G 21/0445; E04G 21/04; E04G 21/0436; Y10T 16/557;
(Continued)

(56) References Cited

U.S. PATENT DOCUMENTS

| 84,771 A | * | 12/1868 | Shannon | .................... E05D 3/02 |
| | | | | 16/263 |
| 3,499,208 A | * | 3/1970 | Gross | ...................... F03B 11/06 |
| | | | | 164/108 |

(Continued)

FOREIGN PATENT DOCUMENTS

| CN | 102518646 A | * | 6/2012 | ......... E04G 21/0445 |
| CN | 103195116 A | | 7/2013 | |

(Continued)

OTHER PUBLICATIONS

International Search Report of PCT/EP2013/064639, dated Oct. 4, 2013.

(Continued)

*Primary Examiner* — Ingrid M Weinhold
(74) *Attorney, Agent, or Firm* — Collard & Roe, P.C.

(57) ABSTRACT

A concrete distributor mast has a plurality of mast arms, which can be moved relative to each other. The mast arms are connected to each other in a hinged manner at coupling points and have in the region of the coupling points hinge points, at which drive and coupling members of a coupling gear mechanism that actuates the mast arm movement are coupled in a hinged manner. Situated at the hinge points of the mast arms are hinge components, which span the respective mast arm transversely and define a bearing axis. At least one of the hinge components has a hinge pin, which is connected in a rotationally fixed manner to the mast arm, projects outwards beyond the mast arm to both sides at the free ends thereof, and is connected in a rotationally fixed manner to the mast arm. On the ends of the hinge pin that (Continued)

project beyond the mast arm, bearing shells are arranged for the rotary bearing of an adjacent drive or coupling member of the coupling gear mechanism. Instead of the hinge pin, two hinge pegs that align with each other can also be used as the hinge components.

6 Claims, 7 Drawing Sheets

(52) U.S. Cl.
CPC ........ *F16C 11/045* (2013.01); *F16C 2326/00* (2013.01); *F16C 2326/20* (2013.01)

(58) Field of Classification Search
CPC ..... Y10T 403/32877; Y10T 403/32967; E05D 2005/102; E05D 2005/106; E05D 5/10; E05D 5/12; E05D 5/125; E05D 5/127; E05D 5/128; F16M 11/10; F16M 11/121; F16M 2200/06; F16M 2200/061; F16M 2200/063
USPC .............. 403/163, 152, 161, 150; 248/276.1, 248/277.1, 284.1, 288.11, 291.1; 414/722, 726; 74/490.05; 384/91, 129, 384/252, 257, 263, 275–276, 281–282, 384/289, 428, 457, 459, 565, 589
See application file for complete search history.

(56) References Cited

U.S. PATENT DOCUMENTS

| | | | | |
|---|---|---|---|---|
| 3,684,324 | A * | 8/1972 | Sterner | F16C 11/04 212/253 |
| 4,076,430 | A * | 2/1978 | Crook, Jr. | B66C 1/34 403/154 |
| 4,192,622 | A * | 3/1980 | Stecklein | E02F 9/006 403/146 |
| 4,379,360 | A * | 4/1983 | Papsdorf | B21D 53/40 16/321 |
| 4,437,646 | A * | 3/1984 | Bigelow | E04G 21/04 251/145 |
| 4,768,839 | A * | 9/1988 | Spindler | B23K 20/129 301/124.1 |
| 5,649,781 | A * | 7/1997 | O'Boyle | F16B 7/04 29/434 |
| 5,906,029 | A * | 5/1999 | Fox | F16C 11/02 16/221 |
| 6,508,019 | B1 | 1/2003 | Sasaki et al. | |
| 6,871,667 | B2 | 3/2005 | Schwing et al. | |
| 7,878,752 | B2 | 2/2011 | Schmeling et al. | |
| 7,963,716 | B2 * | 6/2011 | Yamasaki | E02F 3/301 37/468 |
| 8,366,148 | B2 | 2/2013 | Benz et al. | |
| 8,998,560 | B2 | 4/2015 | Crane et al. | |
| 2002/0023311 | A1 * | 2/2002 | Holt | E05D 5/065 16/221 |
| 2006/0251349 | A1 * | 11/2006 | Schmeling | E02F 9/006 384/91 |
| 2010/0079932 | A1 * | 4/2010 | Zhou | F16M 11/10 361/679.01 |

FOREIGN PATENT DOCUMENTS

| | | |
|---|---|---|
| DE | 2 016 345 A1 | 10/1971 |
| DE | 20 18 500 A1 | 10/1971 |
| DE | 30 13 450 A1 | 10/1981 |
| DE | 198 82 547 T1 | 7/2000 |
| DE | 101 06 427 A1 | 8/2002 |
| DE | 103 28 187 B3 | 5/2005 |
| DE | 10 2007 001 913 A1 | 7/2008 |
| DE | 10 2007 016354 A1 | 10/2008 |
| DE | 10 2008 007 917 A1 | 8/2009 |
| DE | 10 2010 027635 A1 | 1/2012 |
| EP | 1 980 672 A1 | 10/2008 |
| EP | 2 050 881 A | 4/2009 |
| FR | 2 367 153 A2 | 5/1978 |
| GB | 2 132 676 A | 7/1984 |
| JP | 2000 96608 A | 4/2000 |
| JP | 2000-199240 A | 7/2000 |
| JP | 2007205451 A * | 8/2007 |
| WO | 02/064911 A2 | 8/2002 |
| WO | 2006/095239 A1 | 9/2006 |

OTHER PUBLICATIONS

German Search Report in DE 10 2012 215 469.8, dated May 8, 2013, with an English translation of relevant parts.
Scheele Autobetonpumpen aus den 1980er Jahren (Scheele auto-concrete pumps from the 1980 years), Schwing Stetter, prepared by opponent on Apr. 10, 2015 in opposition to European Patent EP 2 890 854 B1.
S31XT—Geteilte Nabe mit Ringnut (Divided hub with ring nut), Schwing Stetter, prepared by opponent on Apr. 10, 2015 in opposition to European Patent EP 2 890 854 B1.
S52SX—Dreipunkthebel mit geteilter Nabe und Hohlbolzen (Three-point lever with divided hub and hollow bolt), Schwing Stetter, prepared by opponent on Apr. 10, 2015 in opposition to European Patent EP 2 890 854 B1.
S58SX—geteilte Nabe an Arm 2, Schwing Stetter (divided hub on arm 2), prepared by opponent on Apr. 10, 2015 in opposition to European Patent EP 2 890 854 B1.

* cited by examiner

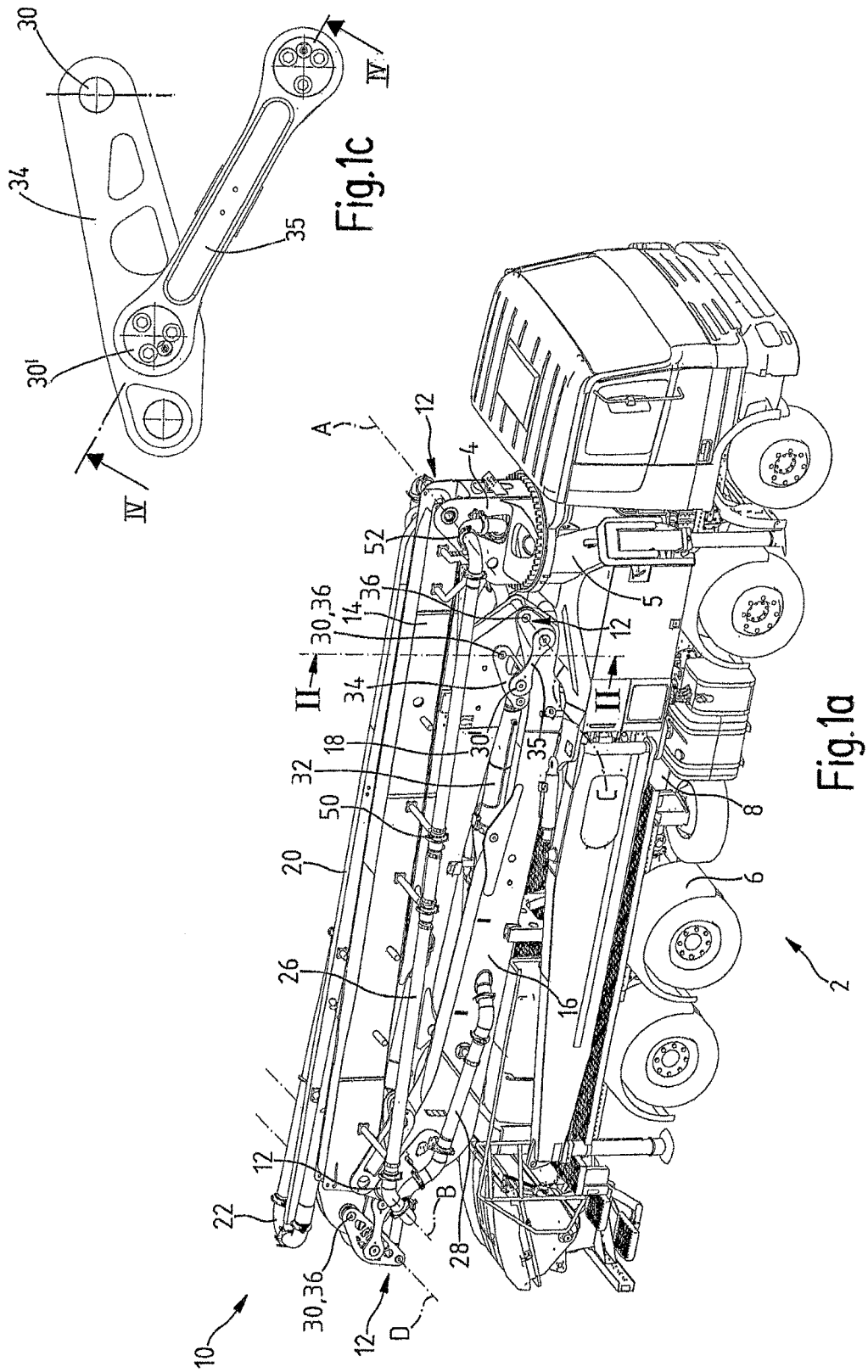

CONCRETE DISTRIBUTOR MAST

CROSS REFERENCE TO RELATED APPLICATIONS

This application is the National Stage of PCT/EP2013/064639 filed on Jul. 11, 2013, which claims priority under 35 U.S.C. § 119 of German Application No. 10 2012 215 469.8 filed on Aug. 31, 2012, the disclosure of which is incorporated by reference. The international application under PCT article 21(2) was not published in English.

BACKGROUND OF THE INVENTION

1. Field of the Invention

The invention relates to a concrete distributor mast with a plurality of mast arms which are movable relative to one another and are connected in an articulated manner to a rotary head and to one another at coupling points, wherein, in the region of the coupling points, the mast arms have hinge points to which drive and coupling members of a coupling mechanism triggering the mast arm movement are coupled, and wherein at least one of the hinge points has a hinge component which is arranged on the mast arm or on one of the coupling members and defines a bearing axis.

2. Description of the Related Art

Known distributor masts, in particular for concrete pumps, have a plurality of mast arms which are connected in an articulated manner to the rotary head and to one another in the region of the coupling points. At each coupling point there is a drive member, which is designed, for example, as a hydraulic cylinder, and a coupling mechanism which is connected downstream and transmits the drive force of the driving members via coupling members from the group consisting of push rod and deflecting lever to the mast arm to be moved. The actual hinges are formed as follows. Tubular bushings, on the inner side of which bearing shells are placed, are welded into the mast arms, which are generally designed as a box profile, at the hinge points. Hinge pins which, owing to the bearing shells, can rotate about their own axis relative to the bushing are inserted through the welding bushings. Bushing, bearing shells and pins form the actual rotary bearing of the hinge here. The pins protrude laterally beyond the mast arm to such an extent that the kinematic elements, such as push rod or deflecting lever, which are required for the coupling mechanism can be attached to the pin and fixed in a manner secure against rotation. A disadvantage of the known construction is the structural outlay thereof, which is caused especially by the welding bushing necessary in this case. This applies all the more when, for each coupling mechanism, there is a plurality of hinge points with the welding bushings provided for them.

SUMMARY OF THE INVENTION

Taking this as the starting point, the invention is based on the object of improving the known concrete distributor mast of the type specified at the beginning by means of a simplified design of the individual hinge points in the region of the coupling points.

In order to achieve this object, the combinations of features according to the invention are proposed. Advantageous refinements and developments of the invention are discussed below.

The solution according to the invention is based especially on the concept that the number of required parts for each hinge point can be reduced when the welding bushings are omitted and, as a result, considerable cost and weight savings can be obtained. In order to achieve this, it is proposed, according to a first variant embodiment of the invention, that the hinge component has a hinge pin which is connected to the mast arm for rotation therewith and protrudes outward at its free ends beyond the mast arm on both sides, and that bearing shells for the rotary bearings of a drive or coupling member of the coupling mechanism or of an adjacent mast arm are arranged on the ends of the hinge pin that protrude beyond the mast arm. Instead of the previously known welding bushing with bearing shell, according to the invention the hinge pin is fitted directly into the mast arm and is connected, preferably welded, thereto in a manner secure against rotation by means of joining technology.

In order to obtain a lighter construction, it is proposed, according to an advantageous refinement of the invention, that the hinge pin is composed of two separate pin halves which each have one of the protruding ends and are welded to each other at the point of separation.

A further improvement in this regard is achieved if the pin halves are of hollow design.

The bearing shells are no longer attached in the interior of the welding bushing, which is now omitted, but rather on the outside of the protruding hinge pin. Owing to the bearing lying on the outside, the coupling members which are attached thereto can rotate relative to the hinge pin. In the case of the solution according to the invention, the hinge pin, the bearing shell and the coupling member fixed thereon therefore form the bearing in the hinge point. The bearing shells and the coupling members are advantageously secured on the ends of the hinge pin against being pulled off.

In a second variant embodiment of the invention, the hinge component has two pivots which are aligned with each other, are connected to the mast arm for rotation therewith, protrude outward to one side each beyond the mast arm and are connected to the mast arm for rotation therewith, and in that bearing shells for the rotational mounting of a drive or coupling member of the coupling mechanism or of an adjacent mast arm are arranged on the ends of the pivots that protrude beyond the mast arm. The bearing pivots of the second variant embodiment are essentially created by the hinge pins of the first variant embodiment being separated and shortened in the central region thereof.

In a preferred refinement of the invention, at least one of the mast arms has a welded construction which is designed as a box profile and has two web plates arranged at a lateral distance from each other, wherein the hinge pins or the pivots have ring portions or ring elements which are arranged at the distance between the web plates from each other and protrude radially beyond the pin or pivot surface. The hinge pins or pivot pins and the web plates can additionally be connected to one another here by a weld or adhesive seam bearing with the seam root thereof against the ring portion.

According to a third variant embodiment of the invention, in which a hinge component is arranged on one of the coupling members, the hinge component spanning the latter transversely and defining a bearing axis, the hinge component has a hinge pin which is connected to the coupling member for rotation therewith, protrudes outward at its free ends beyond the one coupling member on both sides and is connected to the one coupling member for rotation therewith, wherein bearing shells for the rotational mounting of a further drive or coupling member of the coupling mechanism or of an adjacent mast arm are arranged on the ends of the hinge pin that protrude beyond the one coupling member. The coupling member here can have two web plates which are arranged at a lateral distance from each other while, in the region of the hinge point, the hinge pin spans the intermediate space between the web plates and reaches with its free ends outward through a respective aperture in the web plates and is connected, preferably welded, there to the web plates for rotation therewith. In principle, it is also possible here to assemble the hinge pin from two separate pin halves which each have one of the protruding ends and are welded to each other at the point of separation.

According to a further advantageous refinement of the invention, the coupling members are expediently designed as kinematic elements of a coupling mechanism from the group consisting of hydraulic cylinder, push rods and deflecting lever. The coupling mechanisms between the mast arms are advantageously designed as Watt's or Stephenson's chains.

BRIEF DESCRIPTION OF THE DRAWINGS

The invention is explained in more detail below with reference to the exemplary embodiment which is illustrated schematically in the drawing, in which FIG. 1a shows a side view of a truck-mounted concrete pump with a concrete distributor mast;

DETAILED DESCRIPTION OF PREFERRED EMBODIMENTS

Figure 1B:
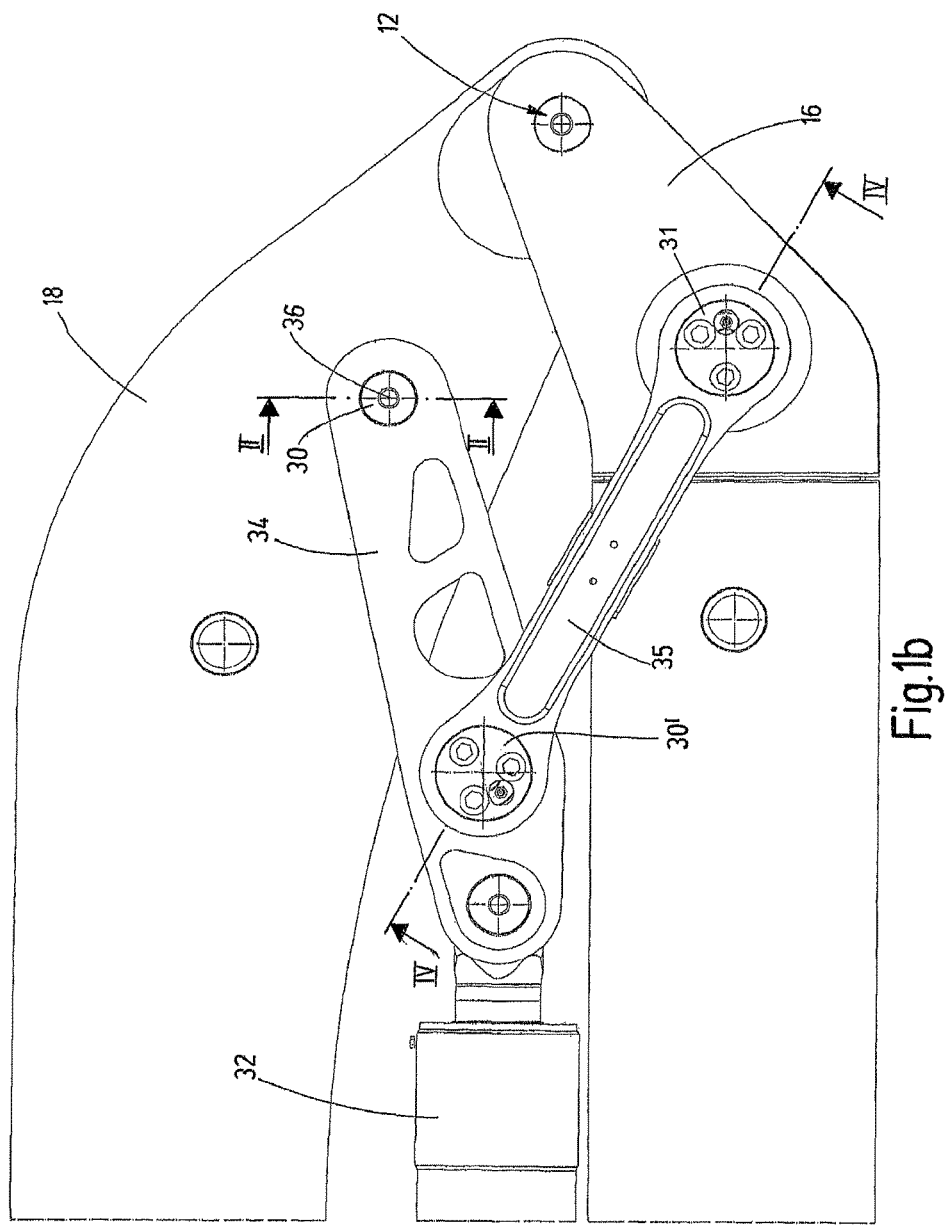
FIGS. 1b and c show an enlarged excerpt from FIG. 1a and an excerpt with two coupling members from FIG. 1b, the drive member being connected to one coupling member in FIG. 1b.

The truck-mounted concrete pump 2 according to FIG. 1a has a bogie 6 with a substructure 8 which bears a concrete distributor mast 10. The concrete distributor mast 10 is accommodated with the rotary head 4 thereof on a mast trestle 5 of the substructure 8 and has articulated hinges 12 in which the mast arms 14, 16, 18, 20 can be pivoted about horizontal axes of rotation A, B, C, D. A concrete delivery line 28 which has pipe bends 22 and pipe segments 26, which are connected to one another by pipe couplings 50 and rotary couplings 52, is guided via the concrete distributor mast 10.

Figure 2:
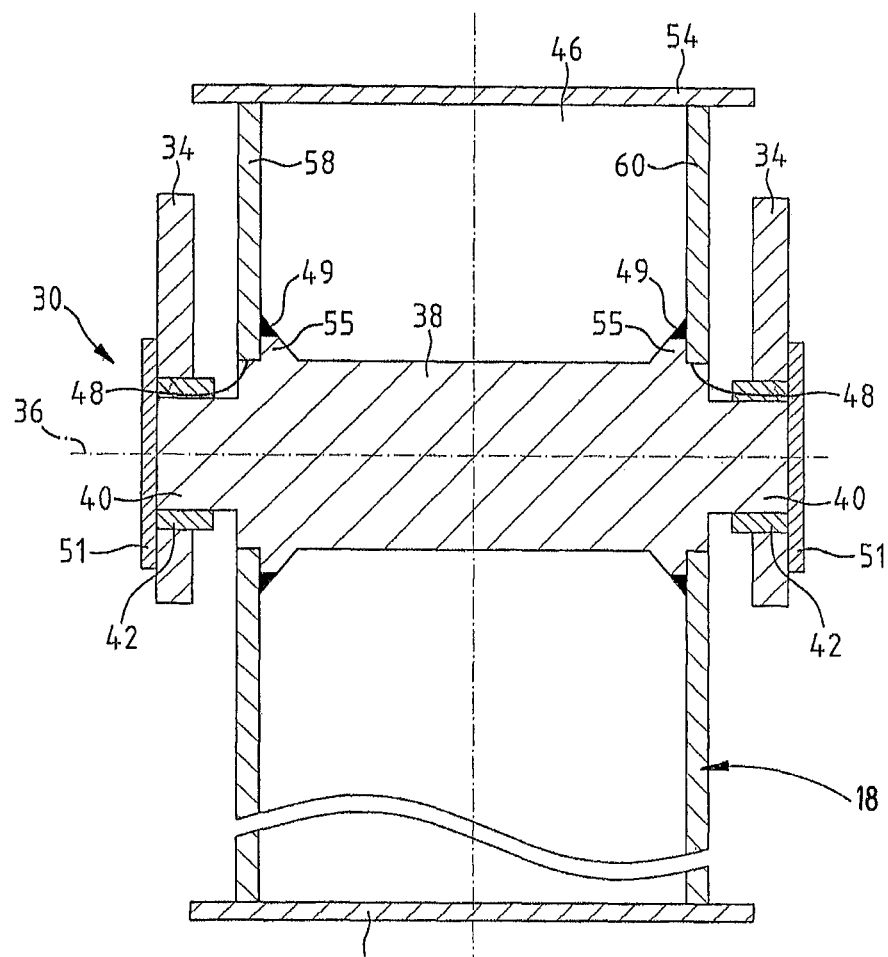
FIG. 2 shows a section through a hinge point along the intersecting line II-II of FIGS. 1a and 1b (first variant embodiment)
Figure 3:
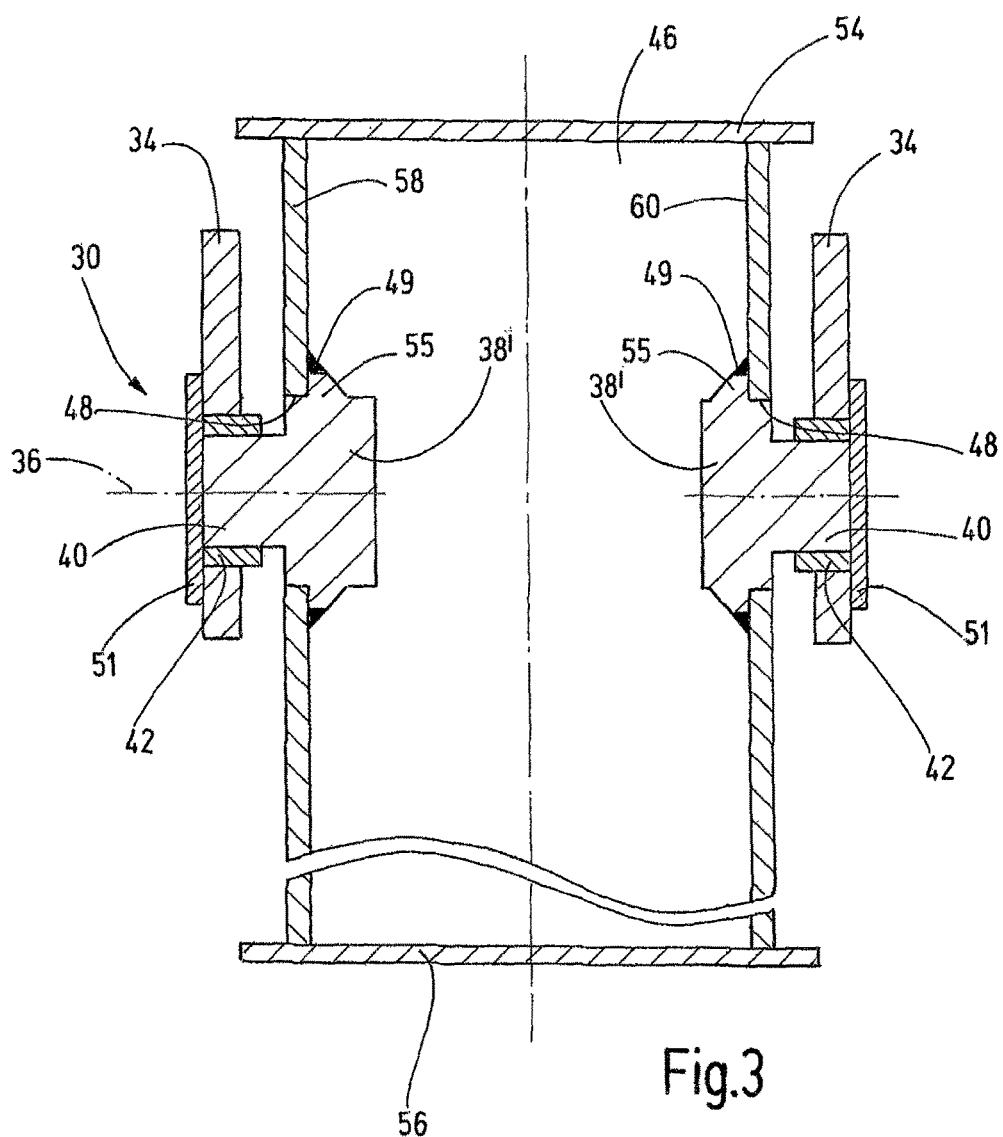
FIG. 3 shows a modified exemplary embodiment in a sectional illustration corresponding to FIG. 2 (second variant embodiment)

FIGS. 1b, 2 and 3 show the mast arm 18 in various enlarged illustrations. The mast arm 18, like the mast arms 14, 16 and 20, has a welded construction designed as a box profile. The mast arms, which are preferably composed of steel, each have an upper boom 54 and a lower boom 56 which are connected to each other by two mutually opposite web plates 58, 60.

The mast arms of the concrete distributor mast are connected to one another in an articulated manner at coupling points in the region of the articulated hinges 12. At the coupling points, the mast arms have hinge points 30, 30', 31 to which drive and coupling members 32, 34, 35 of a respective coupling mechanism triggering the mast arm movement are coupled. Some of the hinge points 30, 30', 31 of the coupling mechanism are formed by a hinge component which spans the mast arm 18 transversely and defines a bearing axis 36.

Figure 5:
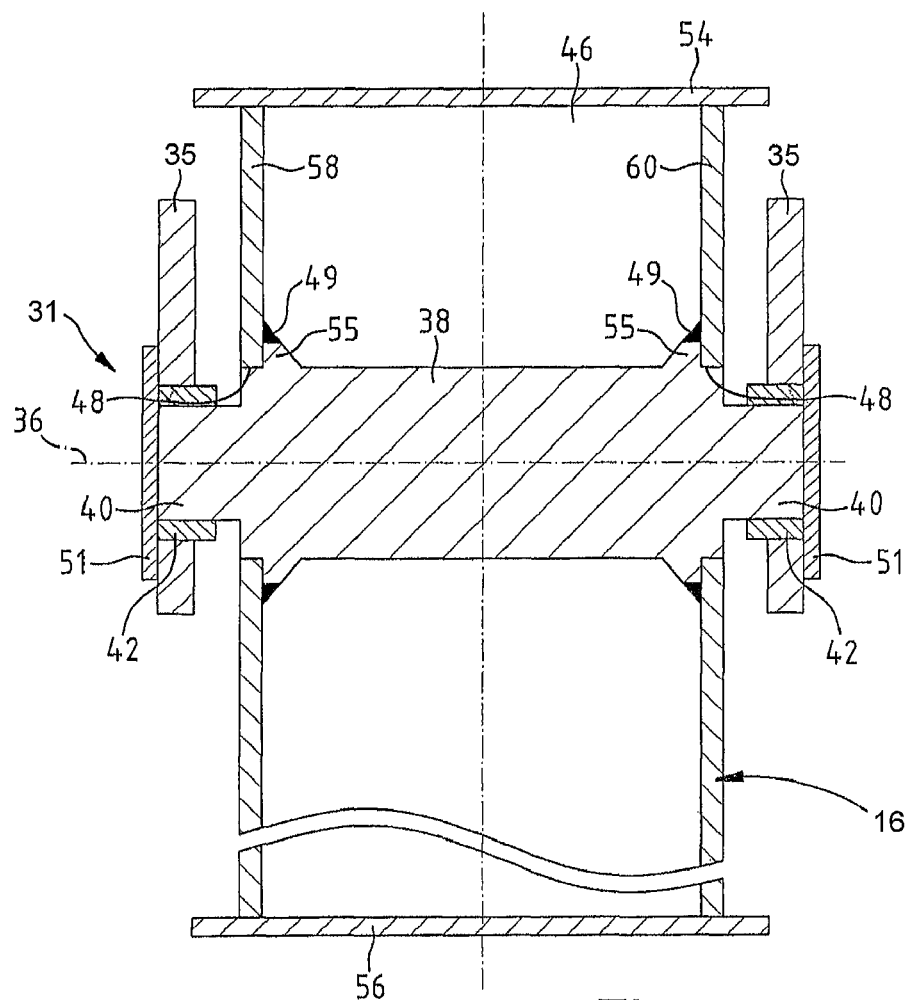
FIG. 5 shows the first variant embodiment but with the second coupling member being mounted to the bearing shells.

In the exemplary embodiment according to FIG. 2 and FIG. 5, the hinge components have a hinge pin 38 which is connected to the respective mast arm 18 (FIG. 2) or 16 (FIG. 5) for rotation therewith, protrudes outward at its free ends 40 beyond the mast arm 18 or 16 on both sides and is connected to the mast arm 18 or 16 for rotation therewith, and plain bearing shells 42 for one of the drive or coupling members 34 of the coupling mechanism are arranged on the ends 40 of the hinge pin 38 that protrude beyond the mast arm. In this exemplary embodiment, in which the mast arm 18 or 16 has a box profile with two web plates 58, 60 arranged at a lateral distance from each other, the hinge pin 38 spans the intermediate space 46 between the web plates 58, 60 and projects with its free ends 40 outward through a respective aperture 48 in the web plates 58, 60. In addition, the hinge pin 38 has two ring portions 55 which are arranged at the distance between the web plates 58, 60 from each other and protrude radially over the pin surface, or ring elements, wherein the hinge pin 38 and the web plates 58, 60 are additionally connected to one another by a weld or adhesive seam 49 bearing with the seam root thereof against the ring portion or the ring element. The bearing shells 42 and the coupling members 34 or 35 are secured on the outer side of the hinge pin from being pulled off from the hinge pin 38 by means of a head 51 which is plugged or screwed thereon.

Figure 6:
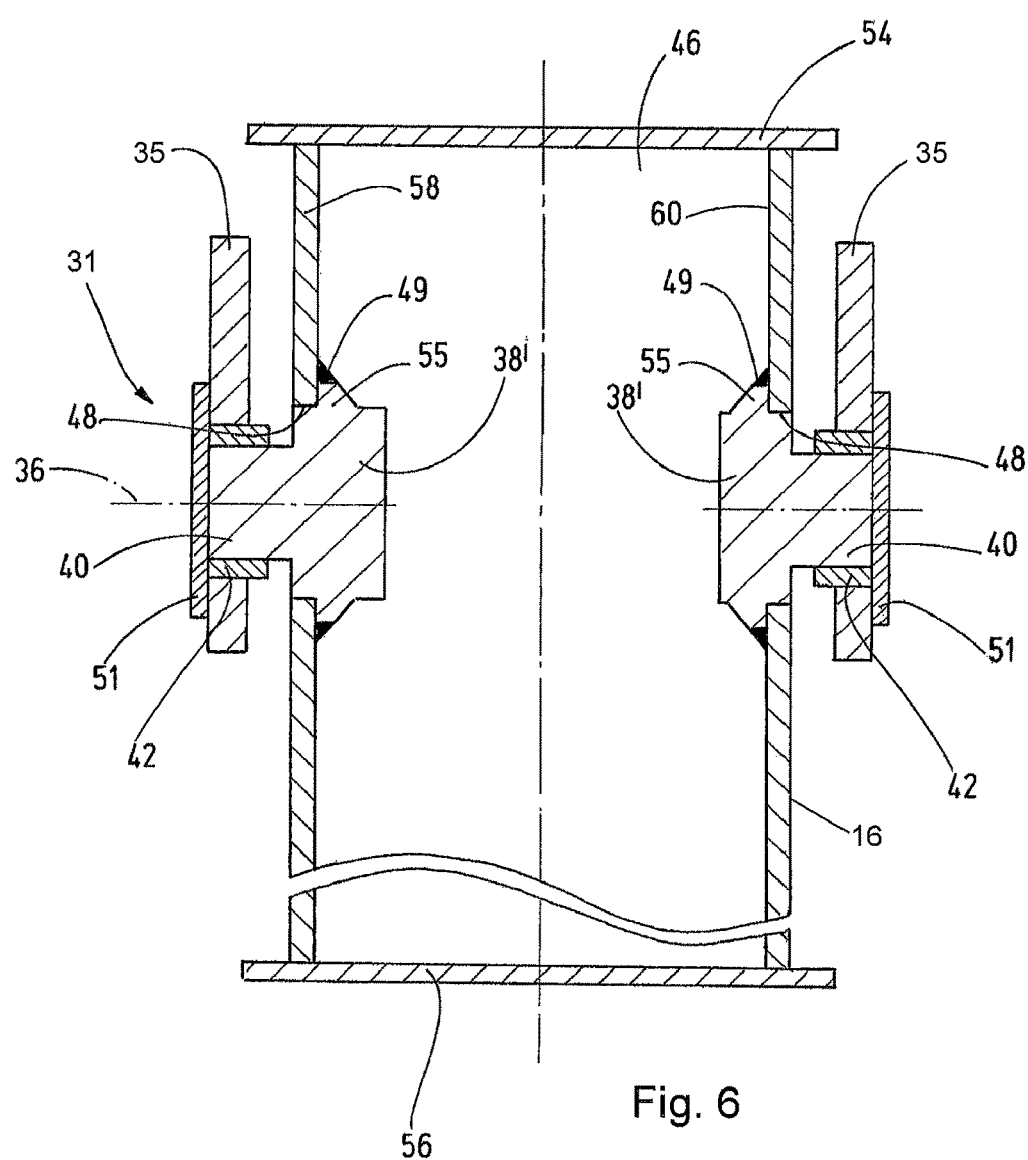
FIG. 6 shows the second variant embodiment but with the second coupling member being mounted to the bearing shells.

The exemplary embodiment according to FIG. 3 and FIG. 6 differs from the exemplary embodiment according to FIG. 2 and FIG. 5 in that the hinge components have two pivots 38' which are connected to the respective mast arm 18 or 16 for rotation therewith, protrude outward at their free ends 40 beyond the mast arm 18 or 16 on both sides and are connected to the mast arm 18 or 16 for rotation therewith and protrude outwards beyond the mast arm at their ends 40. Plain bearing shells 42 for one of the coupling members 34 or 35 of the coupling mechanism are arranged in turn on the protruding ends 40 of the pivots. Also in this exemplary embodiment, the mast arm 18 or 16 has a box profile with two web plates 58, 60 arranged at a lateral distance from each other. The pivots 38' engage in the intermediate space 46 and project outward with their free ends 40 through a respective aperture 48 in the web plates 58, 60 and, in a similar manner to the hinge pin 38 according to FIG. 2, are connected to the web plates 58, 60 for rotation therewith by means of a weld seam 49. The bearing shells 42 and the coupling members 34 are secured on the outer side of the pivots 38' against being pulled off from the pivot 38' by means of a head 51 which is plugged or screwed thereon.

Figure 4:
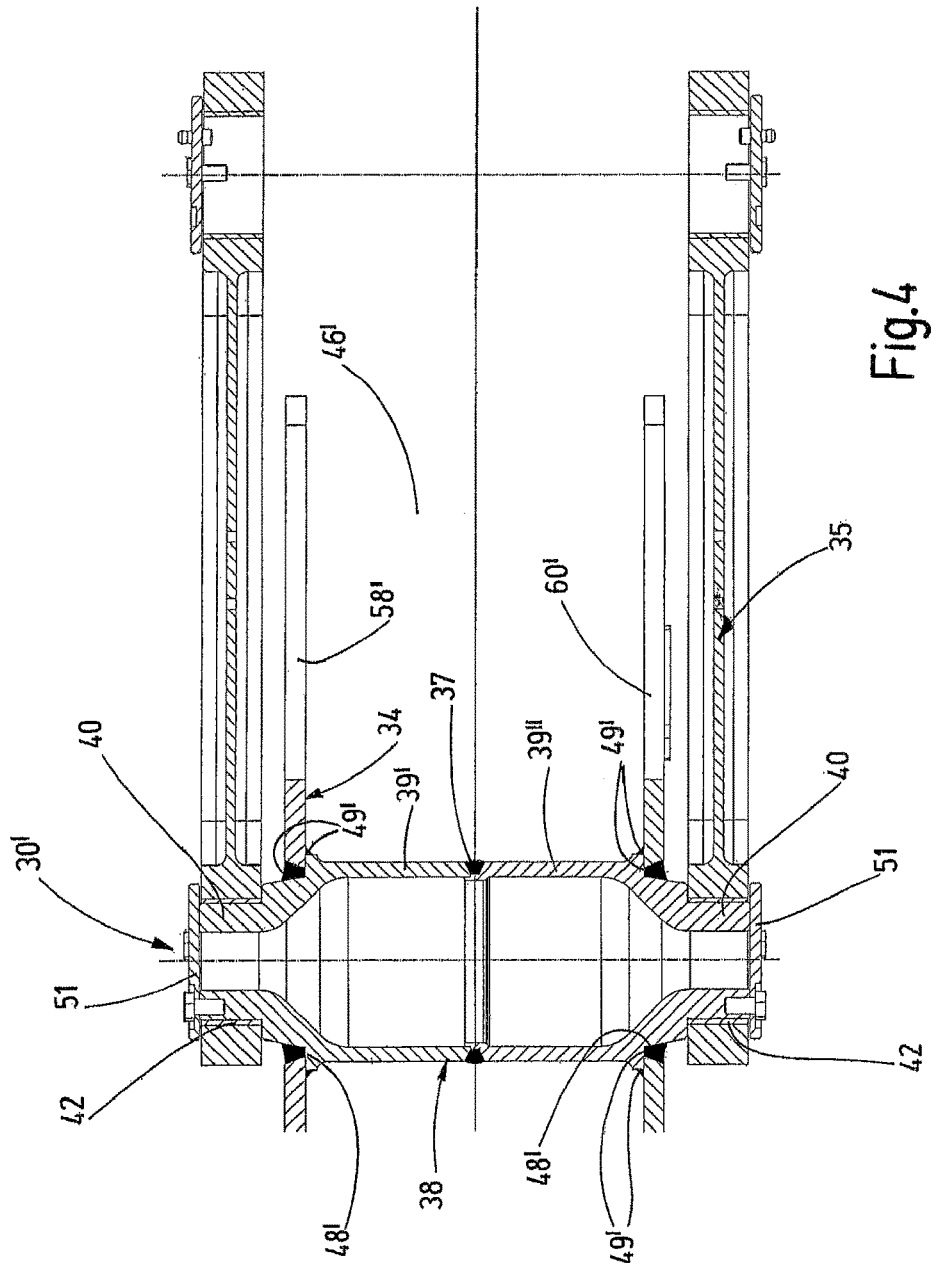
FIG. 4 shows a section through a hinge point along the intersecting line IV-IV of FIGS. 1b and 1c in an enlarged illustration (third variant embodiment)

The exemplary embodiment according to FIG. 4 differs from the exemplary embodiments according to FIGS. 2, 5 and 3, 6 in that the hinge pin 38 is welded to the coupling member 34 and not to one of the mast arms. In the exemplary embodiment shown, the relevant coupling member 34 has two web plates 58', 60' arranged at a lateral distance from each other. The hinge pin 38 spans the intermediate space 46' between the web plates 58', 60' and projects outward with its free ends 40 through a respective aperture 48' in the web plates 58', 60' and is connected to the web plates for rotation therewith by means of a double weld seam 49'. In this exemplary embodiment, the hinge pin 38 is composed of two separate pin halves 39', 39" which each have one of the protruding ends 40 and are welded to each other at the central point of separation 37. The bearing shells 42 and a further coupling member 35 are secured at the protruding ends 40 of the hinge pin 38 against being pulled off from the hinge pin 38 by means of a head 51 which is plugged or screwed thereon.

The rotary head 4 and the adjacent mast arms adjoining the rotary head 4 or the mast arms 14, 16, 18, 20 form, together with the associated drive and coupling members 32, 34, 35, a coupling mechanism for a relative movement of the mast arms in the region of the axes of articulation A, B, C, D. The coupling mechanisms here are preferably designed as Watt's or Stephenson's chains.

In summary, the following can be stated: the invention relates to a concrete distributor mast 10 with a plurality of mast arms 14, 16, 18, 20 which are movable relative to one another. The mast arms are connected to one another in an articulated manner at coupling points and, in the region of the coupling points, have hinge points 30, 30', 31 to which drive and coupling members 32, 34, 35 of a coupling mechanism triggering the mast arm movement are coupled. Hinge components which span the respective mast arm 18 transversely and define a bearing axis 36 are located at the hinge points 30 of the mast arms. A particular feature of the invention consists in that at least one of the hinge components has a hinge pin 38 which is connected to the mast arm 18 for rotation therewith, protrudes outward at its free ends beyond the mast arm on both sides and is connected to the mast arm for rotation therewith. Bearing shells 42 for the rotational mounting of an adjacent drive or coupling member 32, 34 of the coupling mechanism are arranged on the ends 40 of the hinge pin 38 that protrude beyond the mast arm. Instead of the hinge pin 38, two pivots 38' which are aligned with each other can also be used as the hinge components.

LIST OF REFERENCE SIGNS

2 Truck-mounted concrete pump
4 Rotary head
5 Mast trestle
6 Bogie
8 Substructure
10 Concrete distributor mast
12 Articulated hinges
14,16,18,20 Mast arms
22 Pipe bend
26 Pipe segment
28 Concrete delivery line
30,30',31 Hinge point
32 Drive members (hydraulic cylinders)
34,35 Coupling members
36 Bearing axis
37 Point of separation
38 Hinge pin
38' Pivot
39',39" Pin halves
40 Free ends
42 Bearing shell
46 Intermediate space
48 Aperture
49,49' Weld seam
50 Pipe coupling
51 Head
52 Rotary coupling
54 Upper boom
55 Ring portions
56 Lower boom
58,60,58',60' Web plates
A,B,C,D Axes of rotation

The invention claimed is:

1. A concrete distributor mast comprising:
(a) a first mast arm;
(b) a second mast arm connected to the first mast arm in an articulated manner at a first coupling point, the first coupling point defining a first horizontal axis, and the second mast arm being pivotable relative to the first mast arm about the first horizontal axis;
(c) a first coupling member connected to the first mast arm at a first hinge point;
(d) a second coupling member connected to the second mast arm at a second hinge point and to the first coupling member at a third hinge point; and
(e) a first drive member connected to the first coupling member and configured to trigger movement of the first mast arm and the second mast arm with respect to each other;
wherein the first drive member comprises a hydraulic cylinder and the first and second coupling members respectively comprise first and second kinematic elements selected from the group consisting of a push rod and a deflecting lever;
wherein the first hinge point or the second hinge point has a first hinge component spanning the first mast arm or the second mast arm, respectively, transversely and defining a first bearing axis;
wherein the first hinge component comprises a first hinge pin connected to the first mast arm or to the second mast arm, the first hinge pin comprising a first end and a second end;
wherein first and second bearing shells are disposed on the first and second ends, respectively, of the first hinge pin;
wherein the first coupling member is mounted to at least one of the first and second bearing shells or the second coupling member is mounted to at least one of the first and second bearing shells;
wherein the first mast arm or the second mast arm has a welded construction comprising a box profile having an upper boom, a lower boom and laterally-spaced first and second web plates defining an intermediate space between the first and second web plates;
wherein the first and second web plates have first and second apertures, respectively, the first hinge pin spans the intermediate space, the first and second ends of the first hinge pin protrude outward through the first and second apertures, respectively, and the first hinge pin is connected to the first and second web plates;
wherein the first hinge pin has a first pin surface and first and second ring portions respectively disposed adjacent to the first and second web plates and protruding radially beyond the first pin surface;
wherein the first hinge pin and the first and second web plates are additionally connected to each other by respective first and second weld seams or adhesive seams having first and second seam roots, respectively; and wherein said first and second seam roots respectively bear against the first and second ring portions.

2. The distributor mast as claimed in claim 1, wherein the first hinge pin is welded to the first and second web plates.

3. The distributor mast as claimed in claim 1, wherein the first hinge pin is composed of separate first and second pin halves respectively having the first and second ends; and
wherein the first and second pin halves are welded to each other at a point of separation of the first and second pin halves.

4. A concrete distributor mast comprising:
(a) a first mast arm;
(b) a second mast arm connected to the first mast arm in an articulated manner at a first coupling point, the first coupling point defining a first horizontal axis, and the second mast arm being pivotable relative to the first mast arm about the first horizontal axis;
(c) a first coupling member connected to the first mast arm at a first hinge point;
(d) a second coupling member connected to the second mast arm at a second hinge point and to the first coupling member at a third hinge point; and
(e) a first drive member connected to the first coupling member and configured to trigger movement of the first mast arm and the second mast arm with respect to each other;
wherein the first drive member comprises a hydraulic cylinder and the first and second coupling members respectively comprise first and second kinematic elements selected from the group consisting of a push rod and a deflecting lever;
wherein the first hinge point or the second hinge point has a first hinge component disposed on the first mast arm or on the second mast arm, respectively, and defining a first bearing axis;
wherein the first hinge component comprises first and second pivots aligned with each other, the first pivot comprising a first outward end, the second pivot comprising a second outward end;
wherein the first and second pivots are connected to the first mast arm or to the second mast arm;
wherein a first bearing shell is disposed on the first outward end of the first pivot;
wherein a second bearing shell is disposed on the second outward end of the second pivot;
wherein the first coupling member is mounted to at least one of the first and second bearing shells or the second coupling member is mounted to at least one of the first and second bearing shells;
wherein the first mast arm or the second mast arm has a welded construction comprising a box profile having an upper boom, a lower boom and laterally-spaced first and second web plates defining an intermediate space between the first and second web plates;
wherein the first and second web plates have first and second apertures, respectively, and the first and second pivots engage in the intermediate space;
wherein the first outward end of the first pivot protrudes outward through the first aperture;
wherein the first pivot is connected to the first web plate;
wherein the second outward end of the second pivot protrudes outward through the second aperture;
wherein the second pivot is connected to the second web plate;
wherein the first and second pivots have respectively first and second pivot surfaces and first and second ring portions protruding radially beyond the first and second pivot surfaces;
wherein the first and second pivots and the first and second web plates, respectively, are additionally connected to each other by respective first and second weld seams or adhesive seams having first and second seam roots, respectively; and
wherein said first and second seam roots respectively bear against the first and second ring portions.

5. The distributor mast as claimed in claim 4, wherein the first and second pivots are welded respectively to the first and second web plates.

6. A concrete distributor mast comprising:
(a) a first mast arm;
(b) a second mast arm connected to the first mast arm in an articulated manner at a first coupling point, the first coupling point defining a first horizontal axis, and the second mast arm being pivotable relative to the first mast arm about the first horizontal axis;
(c) a first coupling member connected to the first mast arm at a first hinge point;
(d) a second coupling member connected to the second mast arm at a second hinge point and to the first coupling member at a third hinge point; and
(e) a first drive member connected to the first coupling member and configured to trigger movement of the first mast arm and the second mast arm with respect to each other;
wherein the first drive member comprises a hydraulic cylinder and the first and second coupling members respectively comprise first and second kinematic elements selected from the group consisting of a push rod and a deflecting lever;
wherein the third hinge point has a first hinge component spanning the first coupling member and the second coupling member transversely and defining a first bearing axis;
wherein the first hinge component comprises a first hinge pin, the first hinge pin comprising a first end and a second end;
wherein a first bearing shell is disposed on the first end of the first hinge pin;
wherein a second bearing shell is disposed on the second end of the first hinge pin;
wherein the second coupling member is mounted to at least one of the first and second bearing shells;
wherein the first coupling member has laterally-spaced first and second web plates defining an intermediate space between the first and second web plates;
wherein the first and second web plates have first and second apertures, respectively, and the first hinge pin spans the intermediate space;
wherein the first end of the first hinge pin protrudes outward through the first aperture;
wherein the first hinge pin is connected to the first web plate;
wherein the first hinge pin has a first pin surface and first and second ring portions respectively arranged at the first and second web plates and protruding radially beyond the first pin surface;
wherein the first hinge pin and the first and second web plates are additionally connected to each other by respective first and second weld seams or adhesive seams having first and second seam roots, respectively; and wherein said first and second seam roots respectively bear against the first and second ring portions.

\* \* \* \* \*